United States Patent
Soier et al.

(10) Patent No.: US 10,788,390 B2
(45) Date of Patent: Sep. 29, 2020

(54) METHOD FOR THE CALIBRATION OF A TOP DRIVE AND TOP DRIVE FOR A DRILL STRING

(71) Applicant: BAUER Maschinen GmbH, Schrobenhausen (DE)

(72) Inventors: Sebastian Soier, Schrobenhausen (DE); Philipp Otto, Aichach (DE)

(73) Assignee: BAUER Maschinen GmbH, Schrobenhausen (DE)

( * ) Notice: Subject to any disclaimer, the term of this patent is extended or adjusted under 35 U.S.C. 154(b) by 246 days.

(21) Appl. No.: 16/000,356

(22) Filed: Jun. 5, 2018

(65) Prior Publication Data

US 2019/0368961 A1 Dec. 5, 2019

(51) Int. Cl.

| | |
|---|---|
| *G01L 3/02* | (2006.01) |
| *E21B 3/02* | (2006.01) |
| *G01L 25/00* | (2006.01) |
| *E21B 44/06* | (2006.01) |
| *E21B 4/02* | (2006.01) |
| *G01L 27/00* | (2006.01) |

(52) U.S. Cl.
CPC .............. *G01L 27/002* (2013.01); *E21B 3/02* (2013.01); *E21B 4/02* (2013.01); *E21B 44/06* (2013.01); *G01L 25/006* (2013.01)

(58) Field of Classification Search
CPC ........ E21B 3/02; G01L 27/002; G01L 27/006
See application file for complete search history.

(56) References Cited

U.S. PATENT DOCUMENTS

2016/0290045 A1* 10/2016 Heinrichs ................. E21B 3/02

FOREIGN PATENT DOCUMENTS

| WO | 2014/146910 A2 | 9/2014 |
|---|---|---|
| WO | 2016/018617 A1 | 2/2016 |

\* cited by examiner

*Primary Examiner* — David J Bagnell
*Assistant Examiner* — Dany E Akakpo
(74) *Attorney, Agent, or Firm* — Studebaker & Brackett PC

(57) ABSTRACT

A top drive for a drill string, and an apparatus and method for calibrating the top drive. The top drive includes a rotationally driven shaft that is rotatably mounted by a bearing arrangement having at least one axial bearing and at least one load measuring cell for measuring an axial load of the at least one axial bearing. A calibration device including a pressure element is placed at an upper end portion of the drive shaft. The pressure element exerts a defined calibration force onto the drive shaft in an axial direction. The at least one load measuring cell measures the axial load and transmits a measured load value to a comparing unit, which compares the measured load value with the defined calibration force to determine a differential value. The differential value is then used to calibrate the at least one load measuring cell.

10 Claims, 4 Drawing Sheets

METHOD FOR THE CALIBRATION OF A TOP DRIVE AND TOP DRIVE FOR A DRILL STRING

FIELD OF THE INVENTION

The invention relates to a method for the calibration of a top drive for a drill string, the top drive comprising a drive shaft to be rotationally driven by a rotary drive, wherein the drive shaft is rotatably mounted by a bearing arrangement having at least one axial bearing, wherein it is provided at least one load measuring cell which is adapted to measure an axial load at the at least one axial bearing.

Furthermore, the invention relates to a top drive for a drill string, the top drive comprising a drive shaft to be rotationally driven by a rotary drive, wherein the drive shaft is rotatably mounted by a bearing arrangement having at least one axial bearing, wherein it is provided at least one load measuring cell which is adapted to measure an axial load at the at least one axial bearing.

BACKGROUND OF THE INVENTION

From WO 2016/018617 A1 a drilling system including a multi-function measuring unit configured to be coupled to a top drive of a drilling rig and configured to be coupled to a drilling tube is known. The measuring unit comprises a sensor for measuring the torque and a sensor for measuring the tension on the drilling tube. For an efficient drilling operation, a correct sensing of the load on the drilling tube is essential. If the load is too high, the drilling tool at the lower end of the drilling tube could be overloaded and damaged. If the load is too low, an efficient drilling progress cannot be achieved.

A top drive for a drilling rig having a device for pretensioning the bearings of the top drive is known from WO 2014/146910 A2. By the pretensioning of the bearings an adaptation of the top drive to different drilling conditions can be achieved.

SUMMARY OF THE INVENTION

The invention is based on the object to provide a method for the calibration of a top drive for a drill string and a respective top drive for a drill string which allow a particularly exact measuring of the load being exerted on the drill string.

In accordance with the invention, the object is solved by a method for the calibration of a top drive for a drill string, the top drive comprising a drive shaft to be rotationally driven by a rotary drive, wherein the drive shaft is rotatably mounted by a bearing arrangement having at least one axial bearing, wherein it is provided at least one load measuring cell which is adapted to measure an axial load at the at least one axial bearing, wherein
- a calibration device including a pressure element is placed at an upper end portion of the drive shaft,
- by means of the pressure element a defined calibration force is exerted onto the drive shaft in an axial direction,
- by the at least one load measuring cell the axial load is measured and a measured load value is transmitted to a comparing unit,
- by the comparing unit the measured load value being measured by the at least one load measuring cell is compared with the defined calibration force and a differential value is determined, and
- the at least one load measuring cell is calibrated depending on the determined differential value.

Furthermore, the second part of the object is solved by a top drive for a drill string the top drive comprising a drive shaft to be rotationally driven by a rotary drive, wherein the drive shaft is rotatably mounted by a bearing arrangement having at least one axial bearing, wherein it is provided at least one load measuring cell which is adapted to measure an axial load at the at least one axial bearing, wherein,
- a calibration device including a pressure element is placed at an upper end portion of the drive shaft,
- the pressure element is adapted to exert a defined calibration force onto the drive shaft in an axial direction,
- the at least one load measuring cell is adapted to measure the axial load and transmit a measured load value to a comparing unit, and
- the comparing unit is adapted to compare the measured load value being measured by the at least one load measuring cell with the defined calibration force and determine a differential value,
- wherein the at least one load measuring cell is calibrated depending on the determined differential value.

A basic idea of the invention lies in that a calibration device including a pressure element for exerting a defined calibration force is at least partly arranged at a top drive of a drilling rig. Such a drilling rig is generally equipped with one or more load measuring cells for measuring the axial load on a drill string being driven by the top drive. In particular, the axial load is measured by determination of the axial load on the at least one axial bearing of the top drive, as the at least one axial bearing has to bear the substantial part of the axial load of the whole drill string.

According to a consideration of the invention, the accuracy of such load measuring cells could fade over the time. By the arrangement of a calibration device a defined calibration force can be exerted onto the drive shaft in the axial direction and consequently on the at least one axial bearing and the corresponding load measuring cell. By a comparing unit the measured load value of the calibration load is computed and compared with the defined calibration force or calibration load. If a difference is measured, a differential value is generated by the comparing unit, wherein depending on the determined differential value the at least one load measuring cell is calibrated. By this calibration, a high accuracy of the values measured by the load measuring cells can be ensured. Consequently, an efficient drilling operation without on overload of the drilling teeth can be achieved.

According to a preferred embodiment of the invention, a first bearing is provided of which a first axial load is measured by a first load measuring cell and a second bearing is provided of which a second axial load is measured by a second load measuring cell. In general, for each axial bearing a respective load measuring cell is provided. This allows measuring of the total load with high accuracy.

Furthermore, it is preferred that from the first load measuring cell a first load value is transmitted to a control device and from the second load measuring cell a second load value is transmitted to the control device. Depending on the arrangement of the bearings, more than two load measuring cells could be provided. The control device could be part of the control system of the drilling rig or of the calibration device.

It is advantageous that the control device generates a common load value based on the first and second load value and transmits the common load value to the comparing unit. Preferably, the control device is part of the device of the drilling rig for continued measuring of the total or common load of the drilling string. This common load value is transmitted during calibration to the calibration device.

A particular precise calibration can be achieved according to a further aspect of the invention, wherein the pressure element of the calibration device exerts a first calibration force with a first force value onto the drive shaft and at least one further calibration force with a further force value which is different from the first force value.

According to a further development of the invention it is provided that the comparing unit compares the first force value of the pressure element of the calibration device with the measured first axial load value and determines a first differential value, and the comparing unit compares the at least one further force value with the measured axial load value and determines at least one further differential value, and by the comparing unit the first differential value and the at least one further differential value are compared.

In particular, if the comparing unit determines a linear dependency between a difference between the first value and the at least one further value of the pressure element of the calibration device and a difference between the first differential value and the at least one further differential value, then the control device is calibrated. In case of a linear dependency, the control device can be easily calibrated with an electronic tuning of the control device.

If the comparing unit does not determine a linear dependency between the difference between the first value and the at least one further value of the pressure element of the calibration device and a difference between the first differential value and the at least one further differential value, then the at least one load measuring cell is calibrated or replaced. Usually, the calibration of a load measuring cell is combined with a more intensive maintenance of the load measuring cells at the bearings and may include a replacement of the used load measuring cell by a new load measuring cell.

In general, the calibration device could be a stationary equipment. Preferably, the calibration device is a mobile equipment which can be mounted at the drilling rig only for calibration. In particular it is preferred that for placing the calibration device onto the upper end portion of the drive shaft, a flushing head at the upper end portion of the drive shaft is removed. The flushing head is used for transferring fluid to the upper end of the rotating drilling string during normal drill operation. Thus, during calibration the normal drilling operation has to be interrupted.

BRIEF DESCRIPTION OF THE DRAWINGS

In the following the invention is described further by way of preferred embodiments illustrated schematically in the drawings, wherein show.

DETAILED DESCRIPTION OF PREFERRED EMBODIMENTS

Figure 1:
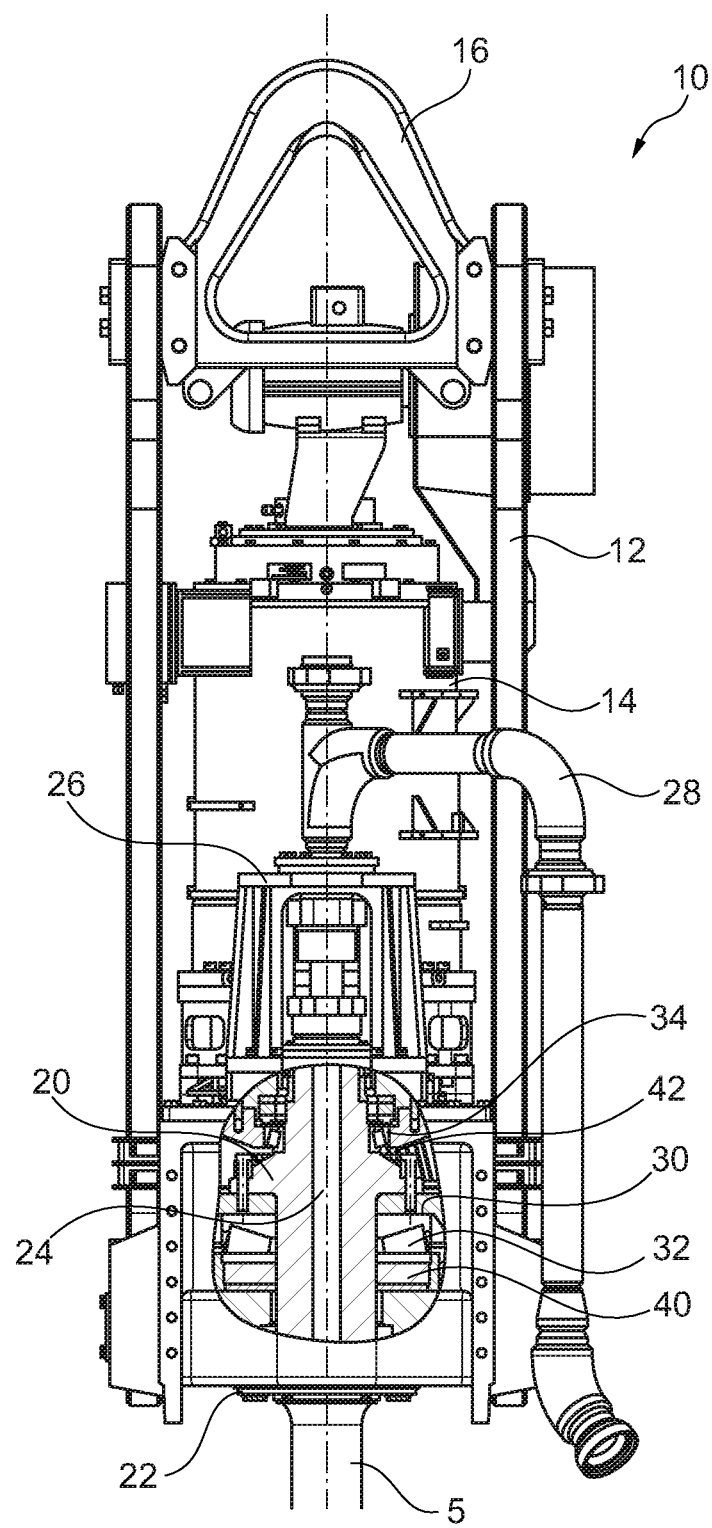
FIG. 1 a front view with a partial sectional view of a top drive with a flushing head.

According to FIG. 1 a top drive 10 comprises a base frame 12 at which a rotary drive 14 is fixed. At the upper end of the base frame 12 a eye- or hook-like attachment 16 is provided by which the top drive 10 can be suspended for example at a rope or another suspension element of a stationary or mobile drilling rig.

The hydraulic rotary drive 14 is an operative connection for rotating the drive shaft 20 by means of a gear mechanism being not shown. By means of a flange connection 22 an upper end of a drill string 5 is firmly connected to the drive shaft 20. The drive shaft 20 is hollow and comprises an internal channel 24 which is in fluid connection with a fluid line 28 by means of a so-called flushing head 26. The flushing head 26 is configured to provide a fluid connection between the static fluid line 28 and the rotatable drive shaft 20 for conveying a flushing medium like water of a drilling suspension, via the internal channel 24 to the tube-like drilling string 5.

The drive shaft 20 is rotatably mounted in the base frame 12 by a bearing arrangement 30. The bearing arrangement 30 comprises a lower first bearing 32 and an upper second bearing 34. The first bearing 32 is adapted as an axial bearing for mainly receiving axial forces from the drive shaft 20. The upper second bearing 34 is mainly receiving radial forces, but also axial forces.

For the more, a first load measuring cell 40 and a second load measuring cell 42 are provided and adapted to measure a first load on the first bearing 32 and a second load on the second bearing 34 respectively. Both load measuring cells 40, 42 are shown only schematically. Both load measuring cells 40, 42 are in communication with an electronic control device being not shown.

Figure 2:
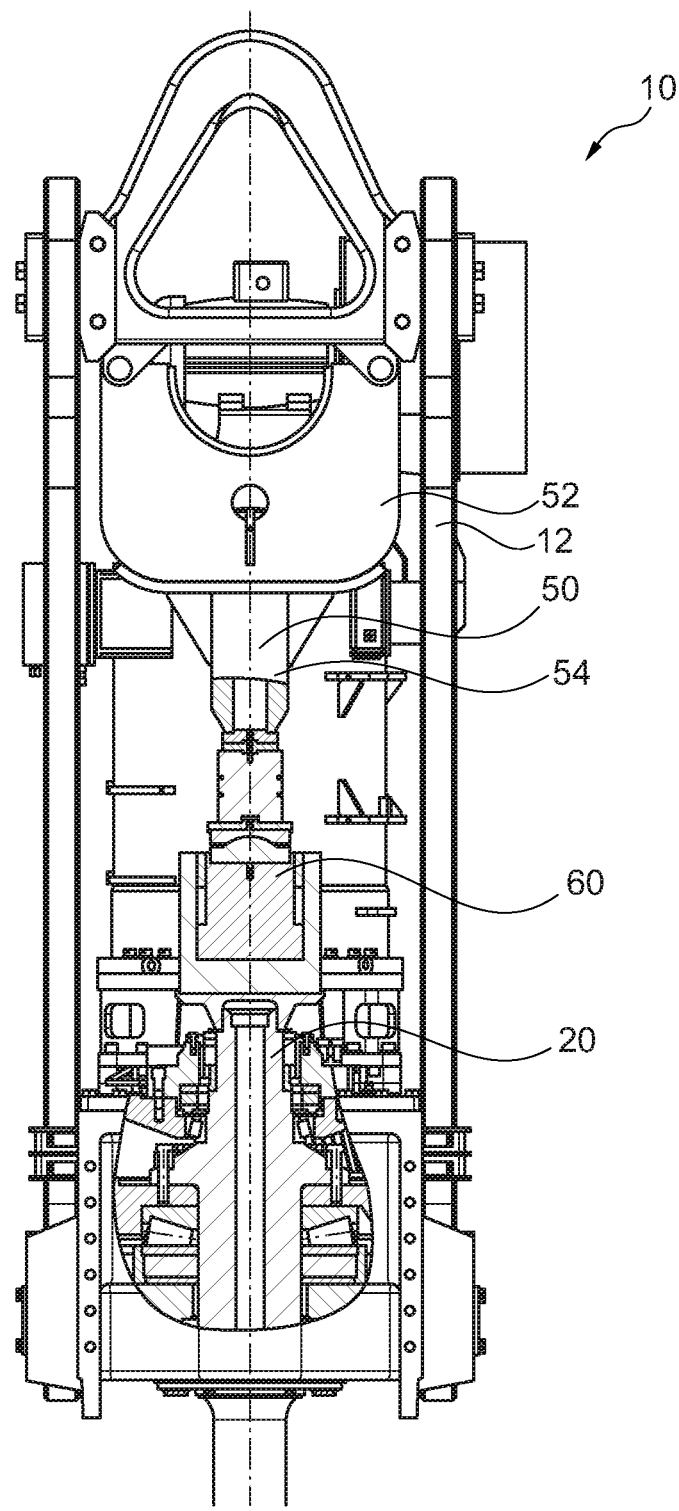
FIG. 2 a front view with a partial sectional view of the top drive of FIG. 1, wherein the flushing head is replaced by a calibration device according to the invention.

FIG. 2 shows the top drive 10 of FIG. 1, wherein the flushing head 26 has been removed and replaced by a calibration device 50 according to the invention. The calibration device 50 comprises a housing 52 which is fixed at the base frame 12 of the top drive 10. Within the housing 52 a hydraulic cylinder being not shown is disposed. By means of this hydraulic cylinder a shaft-like pressure element 54 can be displaced. By means of the pressure element 54 a defined calibration force can be exerted via an adapter 60 to the upper end of the drive shaft 20.

Figure 3:
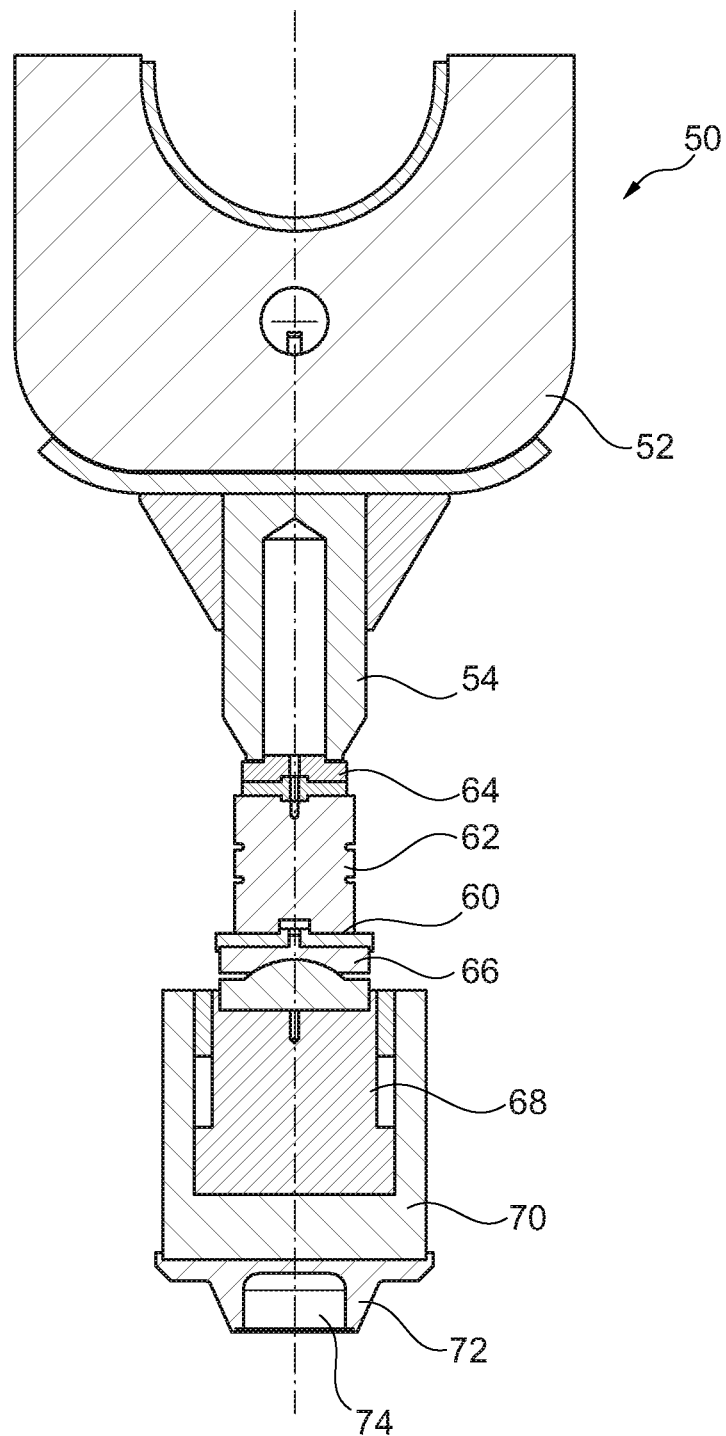
FIG. 3 an enlarged cross-sectional view of a part of the calibration device of FIG. 2.

The calibration device 50 of FIG. 2 is shown and described more detailed in connection with the enlarged drawing of FIG. 3. The adapter 60 is configured to transfer the defined calibration force from the calibration device 50 without lateral or transverse forces to the drive shaft 20. The adapter 60 comprises a cylindrical first block 62 which is connected to the lower end of the movable pressure element 54 by means of two disc elements 64. The number and height of the disc elements 64 can be elected depending on the distance between the calibration device 50 and the upper end of the drive shaft 20.

Furthermore, the adapter 60 comprises a cup-shaped retainer 70 being open at its upper end. A second block 68 is axially guided and movable within an internal space of the retainer 70. The first block 62 and the second block 68 are connected together by means of a cup and ball bearing 66 which can compensate deviations from the axial direction between the calibration device 50 and the drive shaft 20.

The upper end of the drive shaft 20 is placed in a receptacle 74 being arranged at the lower side of an adapter plate 72 being fixed at the lower end of the retainer 70. The calibration device 50 can be connected to the control device and comprises a control unit being not shown.

Figure 4:
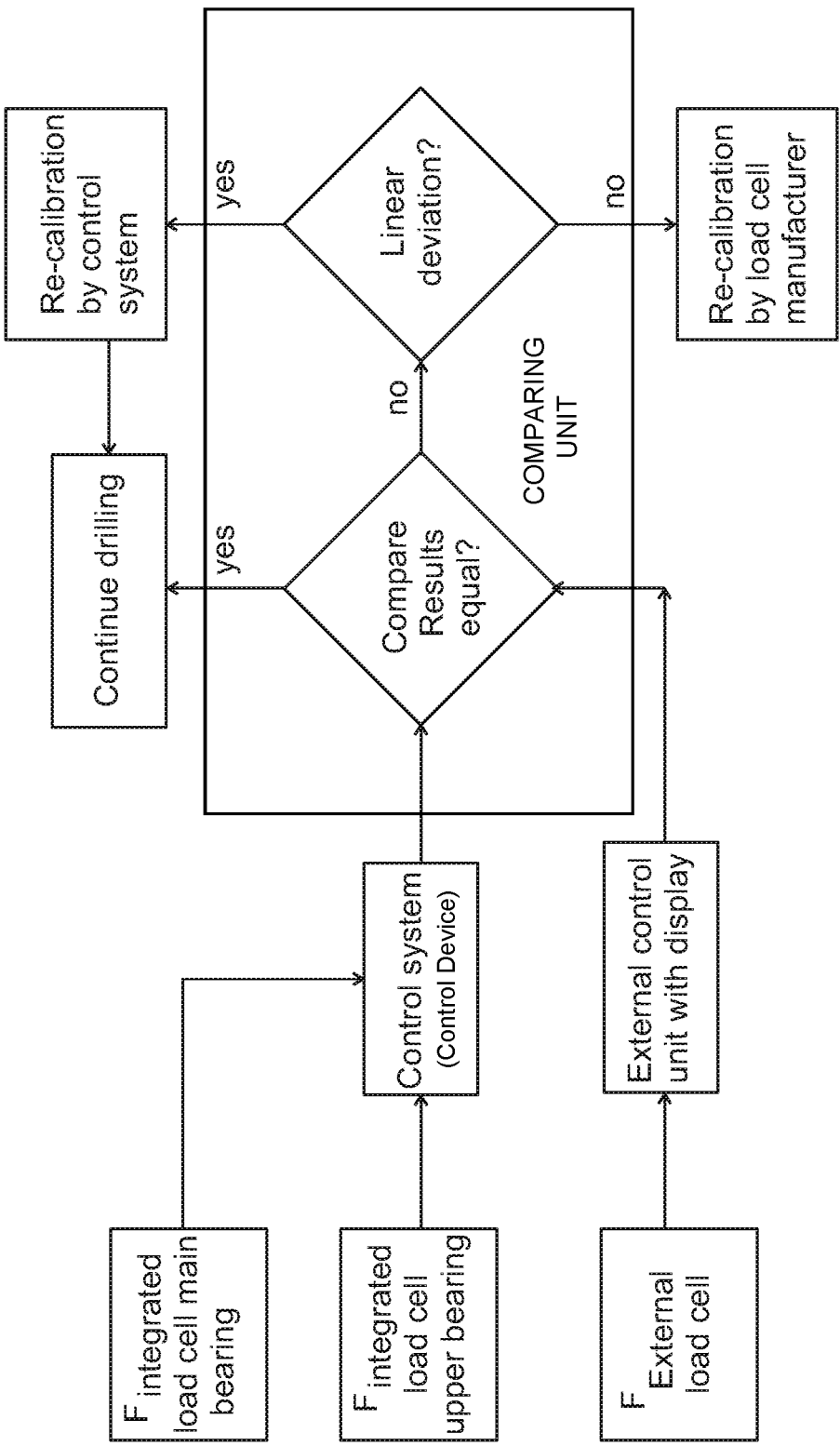
FIG. 4 a sequence of operation diagram for a calibration according to the invention.

A preferred method of calibration of the top drive 10 is schematically shown in FIG. 4. After the flushing head 26 at the top drive 10 has been removed and replaced by a calibration device 50, a defined external force is exerted by means of the pressure element 54 to the drive shaft 20. A control unit of the calibration device 50 communicates the given value or the actual values of the exerted calibration force to a comparing unit wherein the exerted calibration force can be measured by a load cell. Furthermore, the control device or control system of the top drive 10 being in connection with the load measuring cells 40, 42 receives the resulting loads or forces being measured by the first load measuring cell 40 and the second load measuring cell 42. The control device or control system computes the total axial load and provides this value to the comparing unit. In the comparing unit, the measured and determined actual value is compared with the set value exerted by means of the calibration device to the drive shaft 20. If the actual value is equal with the set value, the drilling operation can be continued without any further calibrations or adaptations.

If the actual value differs from the set value, the comparing unit computes a differential value. For the more, the differential value is checked if there is a linear deviation between the actual value and the set value. For checking the linear dependency, at least one further measurement with a different second set value is carried out. The comparing unit determines if there is a linear dependency between a difference between the first value and the at least one further value exerted by the calibration device and a difference between the first differential value and the at least one further differential value. If there is a linear dependency the control device or control system of the drilling rig is electronically recalibrated so that the measured total load corresponds to the defined calibration load exerted by the calibration device. After that the drilling operation can be continued.

If it is recognized by the comparing unit that the deviation is not linear, the load measuring cells 40, 42 have to be replaced or recalibrated by the load cell manufacturer.

By the inventive method the service and the calibration of load measuring components in a top drive 10 can be facilitated. Only in case of a non-linear deviation between the actual values and the set values a consumptious replacement or recalibration of the load measuring cells has to be carried out.

The invention claimed is:

1. A method for the calibration of a top drive for a drill string, the top drive comprising a drive shaft to be rotationally driven by a rotary drive, wherein the drive shaft is rotatably mounted by a bearing arrangement having at least one axial bearing, and wherein at least one load measuring cell is provided which is adapted to measure an axial load at the at least one axial bearing,
wherein
a calibration device including a pressure element is placed at an upper end portion of the drive shaft, and
the method comprises:
exerting, by the pressure element a defined calibration force onto the drive shaft in an axial direction,
measuring, by the at least one load measuring cell the axial load and transmitting a measured load value to a comparing unit,
comparing, by the comparing unit, the measured load value measured by the at least one load measuring cell with the defined calibration force and determining a differential value, and
calibrating the at least one load measuring cell depending on the determined differential value.

2. The method according to claim 1,
wherein the at least one load measuring cell includes a first load measuring cell and a second load measuring cell, and
a first bearing is provided of which a first axial load is measured by the first load measuring cell and a second bearing is provided of which a second axial load is measured by the second load measuring cell.

3. The method according to claim 2,
wherein from the first load measuring cell a first load value is transmitted to a control device, and
from the second load measuring cell, a second load value is transmitted to the control device.

4. The method according to claim 3,
wherein the control device generates a common load value based on the first and second load value and transmits the common load value to the comparing unit.

5. The method according to claim 1,
wherein the pressure element of the calibration device exerts a first calibration force with a first force value onto the drive shaft and at least one further calibration force with at least one further force value which is different from the first force value.

6. The method according to claim 5,
wherein the comparing unit compares the first force value of the pressure element of the calibration device with a measured first axial load value and determines a first differential value, and
the comparing unit compares the at least one further force value with a measured further axial load value and determines at least one further differential value, and
by the comparing unit the first differential value and the at least one further differential value are compared.

7. The method according to claim 6,
if the comparing unit determines a linear dependency between a difference between the first force value and the at least one further force value of the pressure element of the calibration device and a difference between the first differential value and the at least one further differential value, then the control device is calibrated.

8. The method according to claim 6,
if the comparing unit does not determine a linear dependency between a difference between the first force value and the at least one further force value of the pressure element of the calibration device and a difference between the first differential value and the at least one further differential value, then the at least one load measuring cell is calibrated or replaced.

9. The method according to claim 1,
wherein for placing the calibration device onto the upper end portion of the drive shaft, a flushing head at the upper end portion of the drive shaft is removed.

10. A top drive for a drill string, the top drive comprising a drive shaft to be rotationally driven by a rotary drive, wherein the drive shaft is rotatably mounted by a bearing arrangement having at least one axial bearing, wherein it is provided at least one load measuring cell which is adapted to measure an axial load at the at least one axial bearing,
wherein,
a calibration device including a pressure element is placed at an upper end portion of the drive shaft,
the pressure element is adapted to exert a defined calibration force onto the drive shaft in an axial direction,
the at least one load measuring cell is adapted to measure the axial load and transmit a measured load value to a comparing unit, and
the comparing unit is adapted to compare the measured load value being measured by the at least one load measuring cell with the defined calibration force and determine a differential value, wherein the at least one load measuring cell is calibrated depending on the determined differential value.

* * * * *